US010963812B1

(12) United States Patent
Varadarajan et al.

(10) Patent No.: US 10,963,812 B1
(45) Date of Patent: Mar. 30, 2021

(54) MODEL-BASED ARTIFICIAL INTELLIGENCE DATA MINING SYSTEM FOR DIMENSION ESTIMATION

(71) Applicant: Amazon Technologies, Inc., Seattle, WA (US)

(72) Inventors: Vivek Sembium Varadarajan, Bangalore (IN); Rajeev Ramnarain Rastogi, Bangalore (IN); Atul Saroop, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 786 days.

(21) Appl. No.: 15/462,556

(22) Filed: Mar. 17, 2017

(51) Int. Cl.
  *G06N 20/00* (2019.01)
  *G06Q 30/06* (2012.01)
  *G06N 5/04* (2006.01)

(52) U.S. Cl.
  CPC ............. *G06N 20/00* (2019.01); *G06N 5/04* (2013.01); *G06Q 30/0643* (2013.01)

(58) Field of Classification Search
  CPC ....... G06N 20/00; G06N 5/04; G06Q 30/0643
  See application file for complete search history.

(56) References Cited

U.S. PATENT DOCUMENTS

| | | | |
|---|---|---|---|
| 8,463,036 B1 | 6/2013 | Ramesh | |
| 9,514,487 B2 | 12/2016 | Wilkinson | |
| 9,996,981 B1* | 6/2018 | Tran | G06K 9/6206 |
| 2013/0215116 A1* | 8/2013 | Siddique | G06Q 30/0643 345/420 |
| 2015/0254680 A1* | 9/2015 | Scoles | G06Q 30/0201 705/7.29 |
| 2016/0019626 A1* | 1/2016 | Pham | G06Q 30/0631 705/26.7 |
| 2016/0203525 A1* | 7/2016 | Hara | G06Q 30/0271 705/14.56 |
| 2016/0210602 A1* | 7/2016 | Siddique | G06Q 20/0453 |
| 2016/0240002 A1* | 8/2016 | Ogata | G06K 9/4652 |
| 2017/0039622 A1* | 2/2017 | Chen | G06Q 30/0631 |
| 2017/0091844 A1* | 3/2017 | Yarvis | G06Q 30/0623 |
| 2018/0253759 A1* | 9/2018 | Deng | G06Q 30/0254 |

\* cited by examiner

*Primary Examiner* — Kamran Afshar
*Assistant Examiner* — Imad Kassim
(74) *Attorney, Agent, or Firm* — Knobbe, Martens, Olson & Bear, LLP

(57) ABSTRACT

Some aspects of the present disclosure relate to computer processes for generating and training a generative machine learning model to estimate the true sizes of items and users of an electronic catalog and subsequently applied to determine fit recommendations, as well as confidence values for the fit recommendations, for how a particular item may fit a particular user. During training, the disclosed generative model can implement Bayesian statistical inference to calculate estimated true sizes of both items and users of an electronic catalog using both (1) a prior distribution of sizes for items and users and (2) a distribution based on obtained evidence regarding how items actually fit users. The resulting posterior distribution can be approximated using a proposal distribution used to generate the fit recommendations and associated confidence values.

19 Claims, 6 Drawing Sheets

MODEL-BASED ARTIFICIAL INTELLIGENCE DATA MINING SYSTEM FOR DIMENSION ESTIMATION

BACKGROUND

Expressed simply, Bayesian statistical analysis starts with a belief, called a prior, and then updates that belief with observed data. The prior represents an estimate of what the Bayesian model parameters might be and can be represented as a parameterized distribution. The observed data can be gathered to obtain evidence about actual values of the parameters. The outcome of Bayesian analysis is called a posterior, and represents a probabilistic distribution expressing future events in terms of confidence. If further data is obtained the posterior can be treated as the prior and updated with the new data. This process employs the Bayes rule, which indicates a conditional probability, for example how likely is event A if event B happens.

Computer learning models can process large volumes of user and item interaction data (such as data reflective of user interactions with an electronic catalog of items) to provide relevant recommendations for users. Such a computer learning model may be implemented using Bayesian analysis as described above. The parameters of a Bayesian model can be set in a process referred to as training. In Bayesian machine learning, the Bayes rule can be used during training to infer model parameters from data. For example, quantities of interest (such as parameters of a statistical model and sometimes latent variables) can be treated as random variables, and values of these variables can be determined by analyzing a posterior distribution over these quantities given some observed data.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
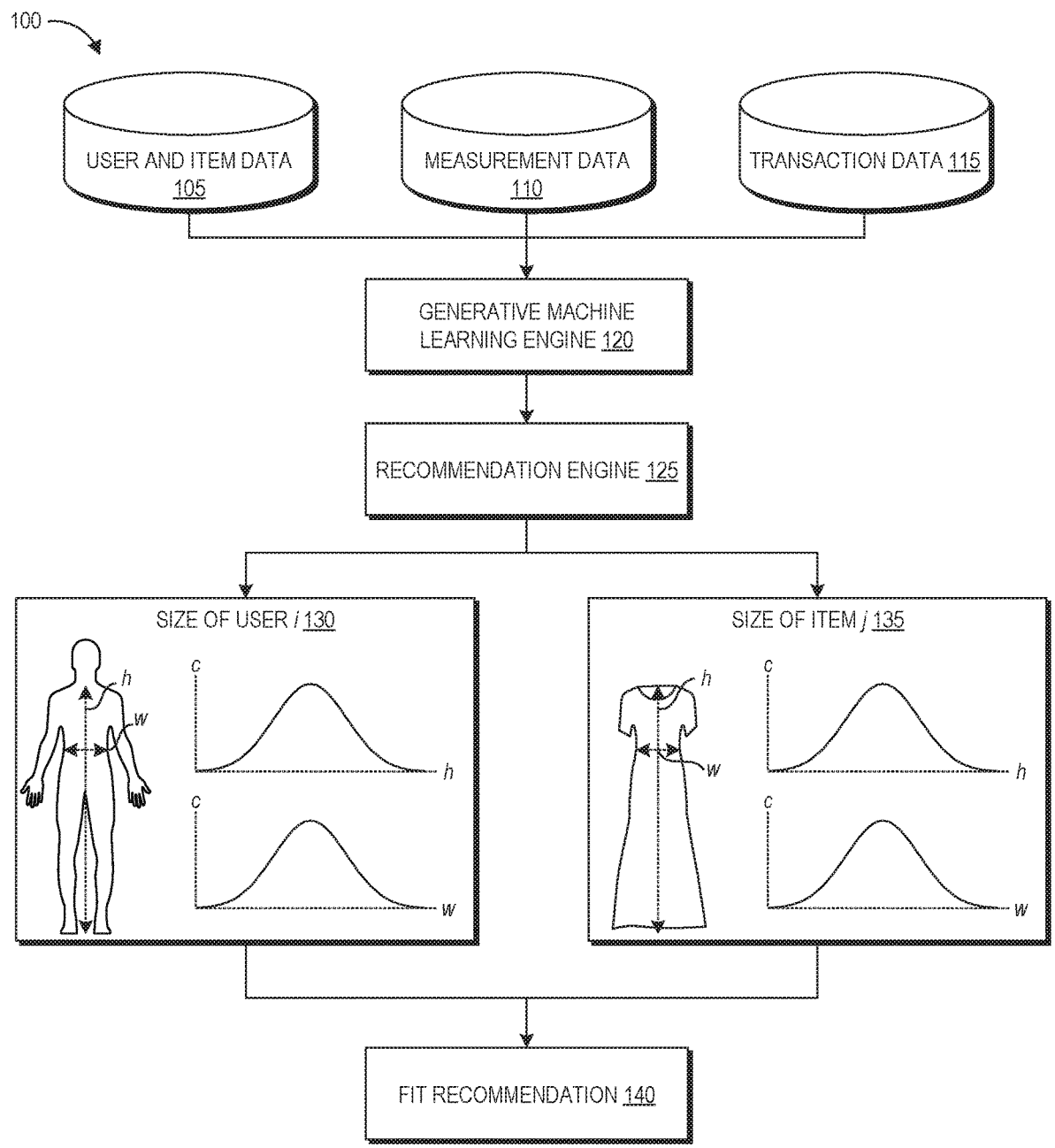
FIG. 1 depicts an illustrative example of data flow within a recommendation system that may be implemented in accordance with at least some embodiments.

The present disclosure is directed to generating and using machine learning models, and specifically to a recommendation system that uses an ordinal regression based Bayesian approach to first estimate true sizes of both products and users of an electronic catalog and then recommend products with a best size fit for a user. An electronic catalog can provide opportunities for users to purchase items without physically interacting with the items prior to purchase. This can present unique challenges for items available in multiple size options, for example items including apparel, footwear, or headgear. Difficulty in identifying the appropriate size of an item without physically interacting with the item can lead to poor user experiences, wasteful remote shopping strategies, and a loss of users from electronic commerce ("ecommerce") systems.

Non-standardization of item sizes is a significant factor contributing to sizing challenges in ecommerce systems. Products are generally not tailor made to individual users, rather they are made with certain discrete measurements chosen by the manufacturer. Due to a lack of standardization or uniformity of how actual measurements correspond to different size options across different item manufacturers, brands, models, markets, geographical regions, and the like, users can find it challenging to identify the size of an item that corresponds to measurements that will best fit their own personal measurements. For example, a size 10 of ABC brand running shoes may be equivalent (or similar) in actual physical measurements to a size 9.5 of XYZ brand running shoes. As such, it can be difficult for users to pick the right size for a desired item in the context of an electronic catalog system or other remote item access environment.

Poorly chosen sizes and user strategies to compensate for sizing variation (e.g., buying multiple sizes of a product and returning those that do not fit) may result in high return rates and poor user experience. For example, in an online shopping context, a user may order three pairs of the same shoes—one of a size they think will fit them as well as a size above and a size below—so that they can try-on the different sizes once the shoes are delivered. Some customer-friendly return policies allow customers to return the two sizes that do not fit at no cost to the customer. This cost may be shifted to the shoe manufacturer or vendors, as they are paying to ship the two "incorrect fit" items to the customer and then again to intake them again upon return. This process causes low efficiency and can have a negative environmental impact due to waste of packaging and shipping resources.

Some systems try to estimate what size for a particular item might best fit a user. However, existing approaches can provide inaccurate fit recommendations for several reasons. One reason for inaccurate recommendations is data sparsity. Typically, a small fraction of users and items are associated with high frequency purchases, and a majority of users and items have very few associated purchases. Thus, it can be difficult to obtain actual size information for the majority of users and items due to data sparsity. Related to this is the "cold start" problem. A typical ecommerce environment is highly dynamic with new users and items entering the system. Fit recommendations may not be possible due to having little or no sizing data available for these new users and items. Another factor contributing to inaccurate fit recommendations is the concept of multiple personas. Many users tend to shop for their families (e.g. spouses, children) and may occasionally purchase gifts for friends. Thus, a user account may have multiple underlying personas with widely varying sizes, and specific purchases made from the account can be analyzed and linked to one of the personas. For example, the personas may each fall into a certain demographic (based on one or more of age, gender, geographic location, and the like), and information about items purchased can be used to link the item to that demographic and thus the persona. In some embodiments, each persona can be analyzed separately in the disclosed machine learning techniques using information mined from the specific purchases associated with that persona. In order to make accurate size recommendations, it is desirable to separate out these personas and learn the individual sizes for each persona.

The above-described problems, among others, are addressed by the disclosed fit recommendation systems and techniques for automatically personalizing the relevant fit recommendation on catalog pages, such as an item detail page visited by a user. Such fit recommendations can be generated using a latent factor generative model that leverages various signals such as past transactions, return history, size to measurement information from manufacturers or sellers, and user-provided measurement information to estimate the true sizes of items and users of an electronic catalog. The model can use an ordinal regression-based Bayesian approach to model the size fit data, which allows the model to (1) capture the acceptable range of fit sizes for a user, (2) handle data sparsity by placing priors on user and item true sizes, and (3) obtain posterior distributions over user and item true sizes. The model can use mean field variational inference to efficiently compute the posterior distribution over user and item true sizes, and can use the posterior distribution to estimate the probability that a particular size of an item fits a user. Thus, the disclosed techniques capture the uncertainty in the inferred true size values and fit probabilities, and take into account the confidence intervals for fit probabilities when recommending the item with the best size fit to a user.

Providing users with accurate fit recommendations and indicators of confidence in the recommendation can improve the operational efficiency of relevant ecommerce systems, fulfillment systems, and machines because an item may only need to be shipped once. Further, the disclosed fit recommendations and provided confidence indicators can influence purchasing behavior of ecommerce system users to mitigate use of the wasteful strategies described above, thereby reducing packaging waste and transportation emissions associated with shipping (for both purchase and return) of multiple size variations of an item.

As will be described in more detail below, in accordance with the model, predicting the size suitability between an item and a user corresponds to an ordinal regression based Bayesian approach to model the size fit data over features of users (e.g. demographic information such as age, gender, past return rates) and items (e.g. brand, catalog size, category), respectively. Leveraging user and item information allows the disclosed model to be used to provide recommendations in cold start scenarios involving new users and items with no associated purchase transaction information.

Accordingly, some aspects relate to a generative machine learning model that can be trained to estimate the true sizes of items and users of an electronic catalog and subsequently applied to determine fit recommendations, as well as confidence values for the fit recommendations, for how a particular item may fit a particular user. In probability and statistics, a generative model specifies a joint probability distribution over observation and label sequences, typically given some hidden parameters, thus providing a full probabilistic model of all variables that can be used to generate values of any variable in the model. During training, the disclosed generative model can implement Bayesian statistical inference to calculate estimated true sizes of both items and users of an electronic catalog using both (1) a prior distribution of sizes for items and users and (2) a distribution based on obtained evidence regarding how items actually fit users. The resulting posterior distribution can be used to generate the fit recommendations and associated confidence values. Some embodiments of the model can be structured to drastically reduce the amount of computation required to reconcile the prior and the observed data, as described in more detail below.

As described above, an initial or prior probability distribution of an uncertain quantity, often simply called the prior, is the probability distribution that would express one's beliefs about this quantity before some evidence is taken into account. In the disclosed techniques, the prior distribution can be generated using measurement data obtained via a measurement project that measures items and/or users, measurements input by users for items and/or themselves, item measurements provided by the seller and/or manufacturer of an item, and/or measurements obtained from a database generally estimating measurements for various sizes. In some embodiments, the prior distribution can be based at least partly on the posterior distribution of a previous iteration of training the model.

The evidence-based distribution used for the disclosed generative model can be based, for example, on fit suitability indications incorporated into the model as a fit parameter. The value of a fit parameter can represent knowledge (or an estimation) of how a purchased item fit the purchasing user mined, for example, from transaction data, user reviews, or feedback solicited from a user.

In some embodiments, generating the posterior probability distribution from the prior probability distribution and the distribution of observed data can be so computationally expensive, particularly when considering the millions of items and users of an electronic catalog, that the model could take years to train using Bayesian statistical inference. Thus, some embodiments of the disclosed generative model can be structured to approximate the posterior probability distribution using a proposal distribution. A proposal distribution is a function for obtaining a set of samples from a probability distribution for which direct sampling is difficult. The two distributions can be reconciled using the proposal distribution to iteratively solve for mean and variant parameters, thus vastly reducing the computation required to generate fit recommendations with probabilities and making this a feasible solution for use in real-time recommendations in a dynamic electronic catalog.

After training, the model can be implemented by a recommendation engine to provide fit recommendations to users regarding a size of a particular item that may best fit the user. During calculation of fit recommendations, the model can generate uncertainty intervals or confidence values representing how likely the fit recommendation is to be accurate. For example, where a large quantity of data is available for determining the size of a particular user, a confidence value for a fit recommendation involving that user may be high. Conversely, where a small quantity of data is available for determining the size of a particular user, a confidence value for a fit recommendation involving that user may be low.

In some embodiments the generative model can be trained offline and then used to provide fit recommendations online. As used herein, "offline" or "offline mode" refers to processing operations relating to data and/or calculations that are pre-computed, that is, performed in advance of an event that may trigger output of a fit recommendation. For example, a generative model as described herein may be trained periodically, such as once per day, and then used by a recommendation engine to generate fit recommendations for users as they interact with the electronic catalog. Some fit recommendations can be provided outside of the context of user interactions with the electronic catalog, for example via targeted advertisements sent via electronic messages to users.

As used herein, "online" or "online mode" refers to processing operations performed in response to an event that triggers output of a fit recommendation. Online fit recommendations can be provided to users in "real time." For example, a fit recommendation provided in real time can be displayed to a user as the user is interacting with the electronic catalog, such as while the user is viewing a detail page for a particular item. In this example, a posterior probability distribution of size suitability can be calculated in an online mode and used to recommend a particular size of the item to the user. Other real time recommendations can be provided while the user is visiting any page of the electronic catalog that is used to display a list of recommended items to the user. In this example, a list of recommended items can be retrieved, a posterior probability distribution of size suitability can be calculated in an online mode, and then the list can be filtered in an online mode based on posterior probability distribution of size suitability so that only items estimated to fit the user are presented as recommended items.

As used herein, a "parent item" refers to a listing for a specific product, while a "child item" refers to a size variation of the parent item. For example, a parent item could refer to a specific green lace keyhole back dress, and three child items would be that dress in sizes small, medium, and large. For purposes of simplifying the description, the word "item" as used hereinafter refers to a child item (e.g., a particular parent item in a particular size) unless otherwise noted or implied by the context of use. A "transaction" or "purchase transaction" can include a purchase of an item, or can include both a purchase and return of the item.

The table below provides definitions of significance for the variables used in the equations presented herein. Where a first variable is used as a subscript of a second variable, this should be read to represent a value of the second variable specific to the first variable, as shown for variables $s_i$ and $t_j$.

| Variable | Significance |
| --- | --- |
| i | user |
| j | child item |
| $y_{ij}$ | fit parameter |
| D | purchase transactions, represented as (i, j, $y_{ij}$) |
| C | set of all users |
| P | set of all child items |
| $s_i$ | calculated true size ("hidden latent size") of a user i |
| $t_j$ | calculated true size ("hidden latent size") of a child item j |
| $c_j$ | catalog size provided by manufacturer |
| α | scale parameter |
| β | latent size vector |
| b1 | small size boundary around calculated true size of a user |
| b2 | large size boundary around calculated true size of a user |
| $σ_t$ | prior variance for child item size |
| $σ_s$ | prior variance for user size |
| $μ_i$ | mean user size |
| m | mean parameter |
| υ | variant parameter |
| P(β\|D) | posterior distribution of latent sizes |
| q | proposal distribution - approximation of p(β\|D) |

For purposes of simplicity, some examples presented herein may consider the user and item sizes to be single dimensional, and may consider orders for each account as being for a single person. However, it will be appreciated that the disclosed techniques can be generalized to handle multi-dimensional size vectors (e.g., vectors representing a number of different dimensions such as waist, hip, and inseam measurements usable for determining pants fit). Further, the disclosed techniques can be extended to incorporate personas (e.g., where purchases from a single user account correspond to multiple persons, for example a family). To address the case where an account may correspond to multiple personas, the disclosed techniques can use an additional latent variable to model the active persona associated with each purchase.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting.

Overview of Example Fit Recommendations

FIG. 1 depicts an illustrative example of data flow within a recommendation system 100 that may be implemented in accordance with at least some embodiments to generate fit recommendations for users.

Data from a user and item data repository 105, measurement data repository 110, and transaction data repository 115 can be provided to generative machine learning engine 120 for training a generative model. The generative model can be a probabilistic model for learning the latent true size of users $\{s_i\}$ and items $\{t_j\}$ in an electronic catalog. The true sizes can be used to estimate the fit size probability $P(y_{ij}=Fit|D)$ between a given user and a given child item.

The user and item data repository 105 may be used to retain information about items available within an electronic catalog and users of the electronic catalog. In some embodiments these can be stored in separate data repositories. Items can include physical and/or digital products available for purchase in an electronic marketplace, however for purposes of the disclosed fit recommendations it will be appreciated that only physical items having dimensional fit relationships to purchasing users may be considered by the disclosed techniques. Users may create accounts with the electronic catalog, and behaviors of the user with respect to the content of the catalog can be logged in association with the user account. Some user accounts may represent a single person, while some accounts may represent a number of different persons, for example in the case of a family that uses a single account for shopping in the catalog. The user and item data repository 105 may be updated as the number of users and/or selection of available items changes over time.

The measurement data repository 110 can store measurements representing sizes (e.g., small, medium, large, etc.) and/or dimensions of users and items. Measurement data can come from one or more of a variety of sources. For each child item j, measurement data repository 110 can access the catalog size cj provided by the manufacturer or seller of the item. In some embodiments, item and user measurements can be determined by a measurement project in which the physical measurements of various dimensions of a sampling of items are determined, and user measurements can be derived from the physical measurements of items that fit that user. In some embodiments, users may be able to input their measurements, for example via a user interface that accepts numerical inputs and/or body scans. In some embodiments, measurement data can be accessed from a fitness application used by the user, or predicted using a growth function (for example for growing children).

The transaction data repository 115 can store data representing a set of past transactions D. In some examples, each transaction in D is a triple of the form (user, child item, fit suitability code). Specifically, each transaction can have the form (i, j, yij) where i is the user making the purchase, j is the purchased child item, and yij is either "Fit" if the user does not return the child item, or the fit suitability code is provided by the user when returning a purchased child item, which can be "Small" or "Large."

The generative machine learning engine 120 can train a model based on the data from the user and item data repository 105, measurement data repository 110, and transaction data repository 115. For example, given past transactions D and catalog sizes $\{cj\}$ for items, the model trained by the generative machine learning engine 120 can compute true sizes $\{si\}$ for user and $\{tj\}$ for items. As used herein, a "true size" refers to one or more measurements estimated for an item or user.

For a user i and item j, the recommendation engine 125 can use the true sizes computed by the model to estimate the size fit probability P(yij=Fit|D). For example, the recommendation engine 125 can use the model to map individual users to their respective one or more latent factors representing true physical measurement(s) associated with the user. As shown in FIG. 1, a size 130 of user i is calculated in the height h and width w dimensions for a portion of the body. In this example, the portion corresponds to where a full-length dress would be worn, as the item j is a maxi dress. The recommendation engine 125 can also use the model to map individual items to their respective one or more latent factors representing true physical measurement(s) associated with the item. As shown in FIG. 1, a size 135 of item j is calculated in the height h and width w dimensions of the full-length dress. As shown, the model can output a probability curve (for example a Gaussian distribution) for each measurement providing a value of the measurement and a confidence c in the value.

The size fit probability can be used to generate a fit recommendation 140. The fit recommendation 140 can include a specific recommended size option of a parent item, and can additionally include a confidence indication representing a calculated probability that the recommended size option will fall within the acceptable fit range of the user.

Figure 2A:
FIGS. 2A and 2B depict illustrative examples of user interfaces for presenting fit recommendations as described herein.

FIG. 2A depicts an illustrative example of a user interface 200A for presenting fit recommendations as described herein, for example the fit recommendation 140 of FIG. 1. The user interface 200A depicts an item detail page, such as a web page or a page displayed by a non-web-based mobile application, including a graphical depiction of an item 210, information 220 about the item, and options 240 for a user to purchase the item 210 or save the item 210 to a digital wish list collection.

Relating to the fit recommendation, the user interface 200A also includes a selectable size menu 225. As depicted, the menu 225 is pre-set to size medium based on the size identified as the recommended fit for the user and is accompanied by a description 230 of the recommendation including the confidence value. The confidence value can be affected by factors including volume of data available for the user and/or the item. Further, the user interface 200A includes a selectable option 235 to change fit preferences, which may take a user to another interface for providing measurements of the dimensions of the user and/or ranges of measurements that the user finds comfortable for different types of apparel.

Figure 2B:
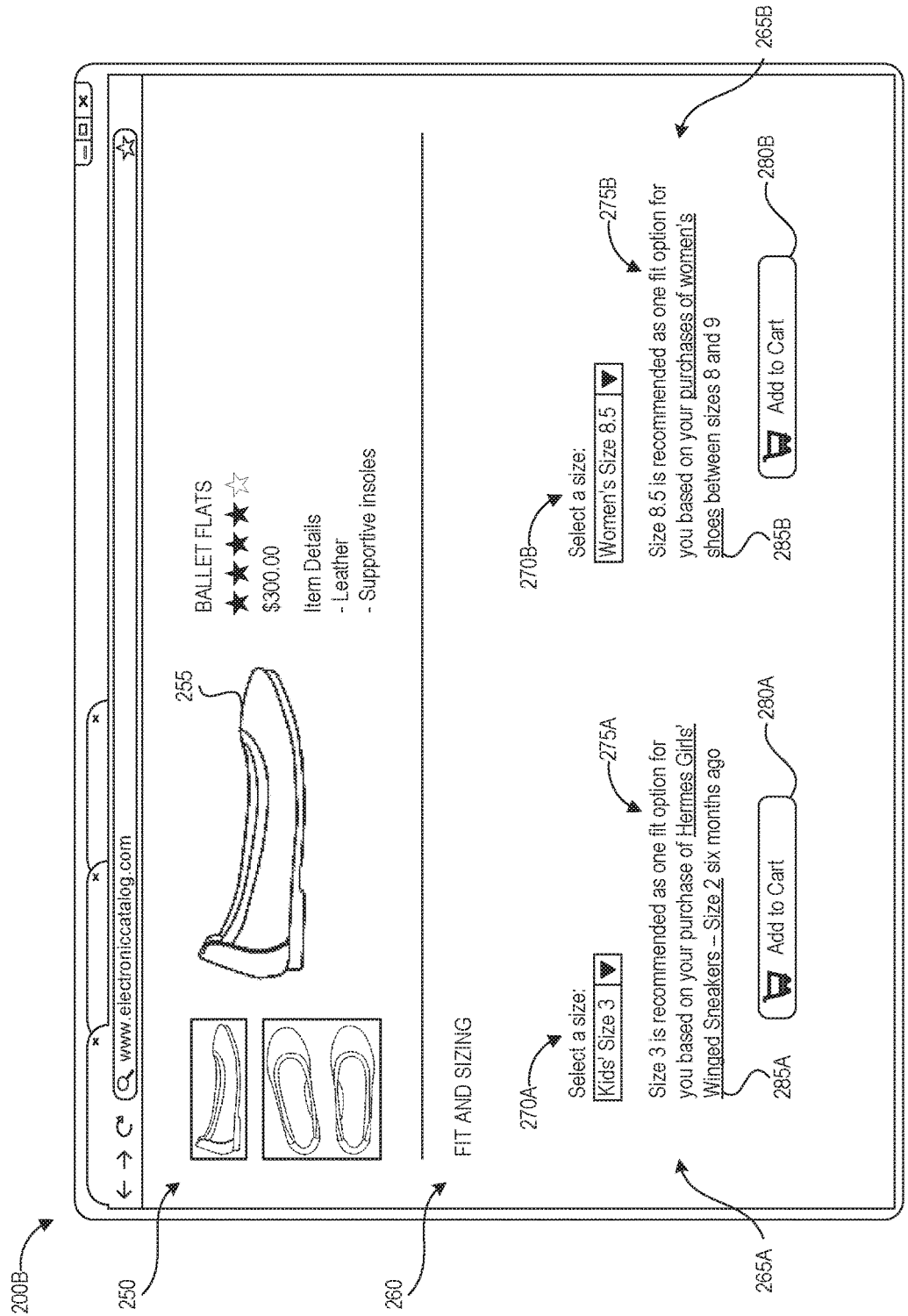

FIG. 2B depicts another illustrative example of a user interface 200B for presenting fit recommendations as described herein. The user interface 200B depicts another example item detail page including an item detail section 250 displaying graphical depictions of an item 255 (a pair of ballet flats) as well as information about the item, and also including a fit and sizing section 260.

The fit and sizing section 260 includes two different recommendations 265A, 265B each presented for a different persona associated with the user account. In the present example, recommendation 265A is presented for a female child persona associated with the user account and recommendation 265B is presented for a female adult persona associated with the account. Each recommendation includes a selectable size option menu 270A, 270B, an explanation 275A, 275B including a selectable link 285A, 285B, and a selectable purchase option 280A, 280B.

With respect to recommendation 265A, the menu 270A is pre-set to size 3 and is accompanied by description 275A explaining that this size is recommended based on a specific purchase six months prior of Hermes Girls' Winged Sneakers in size 2. In the description 275A, the title of this prior purchase is structured as a user-selectable link 285A to the item detail page of the sneakers. In this example, a larger size than the previous purchase may be recommended due to an estimation of the actual shoe size of the female child persona having increased one shoe size based on a growth function. The size 3 recommendation can further be based on whether or not the user returned the Hermes Girls' Winged Sneakers and/or an actual size of the ballet flats 255 determined as described herein. Though not illustrated, the description 275A could also include explanation of a confidence value as described herein for the size 3 recommendation.

With respect to recommendation 265B, the menu 270B is pre-set to size 8.5 and is accompanied by description 275B explaining that this size was recommended based on a number of purchases of women's shoes between sizes 8 and 9. The description 275B includes a user-selectable link 285B to view a list of the specific items purchased together with size information about the items, for example which sizes were purchased and optionally whether the size fit the user, was too small, or was too large. As described herein, the size recommendation can be based on a fit probability distribution between a calculated actual measurement of the size 8.5 ballet flats and a calculated actual measurement of the female adult persona shoe size. Though not illustrated, the description 275B could also include explanation of a confidence value as described herein for the size 8.5 recommendation.

Although the user interface 200B includes recommendations for two personas, other personas may be associated with the user account. For example, the user account may also be associated with a male adult. A recommendations system as described herein may elect to present size recommendations for only a subset of personas associated with a user account based on any one of a number of determinations. For example, the recommendations may be presented for the female child and female adult and not the male adult based on the shoe category being "women's and girls' shoes," based on a disinterest of the male adult persona in ballet flats or preference of the male persona for male apparel items detected based on his interactions with the electronic catalog, or based on a fit suitability determination that none of the available size options for the ballet flats 255 would fall between upper and lower comfortable fit thresholds around the determined actual shoe size of the male adult persona. Thus, persona-specific recommendations can be presented or not presented based on the determined fit suitability between an item and a user account persona, preferences of the user account persona mined from logged user behaviors, item category and persona attributes, and the like.

It will be appreciated that the user interfaces 200A, 200B are just a few examples of how fit recommendations could be presented to users. In various examples, based on the estimated true sizes the recommendation engine can automatically recommend the best fit size of an item, can filter recommended items or search results to exclude items that will not fit a user, and can reorder recommended items or search results to surface items estimated to have a suitable fit above items estimated to have a large or small fit.

To account for the possibility that different purchases within the account were made for different individuals, the user interface may also display an indication of the prior purchases (items) on which the recommendation is based. In such embodiments, the user interface may also allow the user to specify that a given purchase was made for a different individual, or may otherwise enable the user to specify that the purchase should be disregarded for purposes of generating the size recommendation. Once the user specifies that one or more prior purchases should be disregarded, the system may generate and output an updated size recommendation. In some embodiments, the catalog interface may also provide an option for the user to designate, at the time of a purchase of a child item, the particular individual for which the purchase is being made; in such embodiments the system may use these designations to prevent purchases made for one individual from being used to generate size recommendations for another individual.

Example Process for Generating a Recommendation via a Generative Model

Figure 3A:
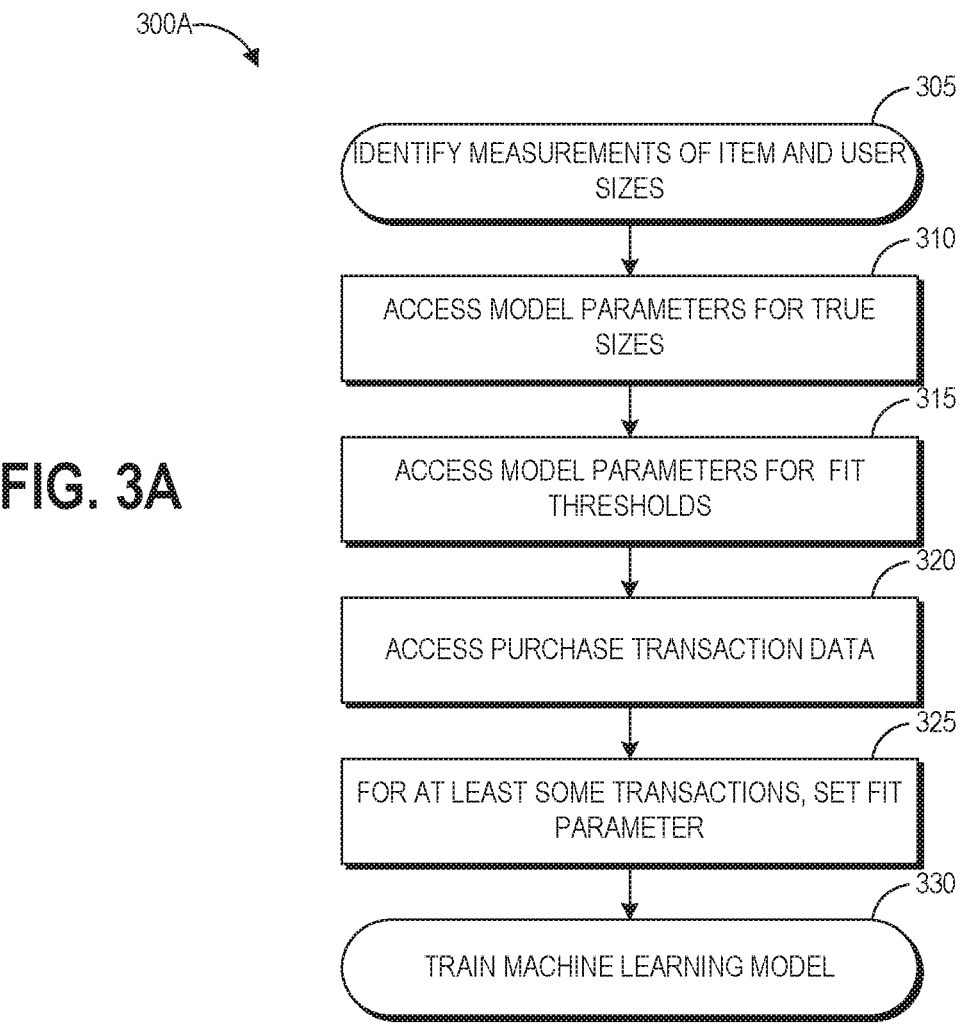
FIG. 3A depicts a flow diagram of an illustrative process for training a machine learning model, for example as discussed with respect to FIGS. 1 and 4.
Figure 3B:
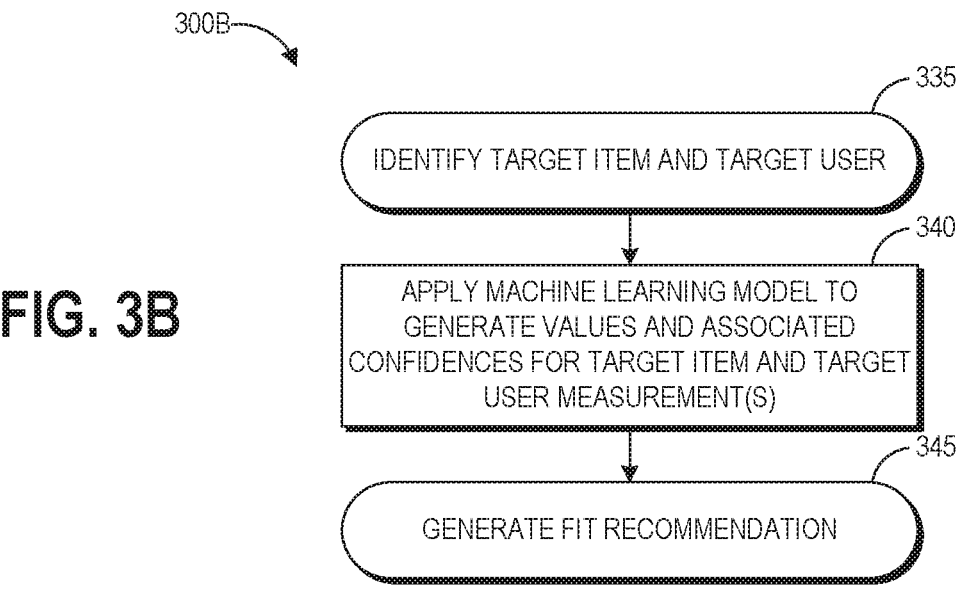
FIG. 3B depicts a flow diagram of an illustrative process for providing fit recommendations in the recommendation engine of FIG. 1 via a generative model trained as described with respect to FIG. 3A.

FIGS. 3A and 3B depict flow diagrams of two portions 300A, 300B of an illustrative process for providing fit recommendations for pairings of target users and target items. FIG. 3A depicts a flow diagram of an illustrative process for training a machine learning model, for example as discussed with respect to FIGS. 1 and 4. FIG. 3B depicts a flow diagram of an illustrative process for providing fit recommendations in the recommendation engine of FIG. 1 via a generative model trained as described with respect to FIGS. 3A and 4. In some examples, the processes 300A, 300B may be performed by the interactive computing system 500 of FIG. 5.

Turning to FIG. 3A, at block 305 the process 300A can identify measurements of item and user sizes, for example from measurement data repository 110. As discussed above, these measurements can be obtained via a measurement project, provided by sellers, manufacturers, and users, default measurements from a size to measurement chart, and the like. One example of a suitable measurement project relates to a system for measuring the internal dimensions of footwear or other garments. Using a measuring tip, a sensor collects 3D data points inside the garment to determine an interior volume. If the measuring tip includes a pressure sensor, the ability of the garment material to stretch may also be measured. Such a system is disclosed in U.S. Pat. No. 9,514,487 titled "Internal measurement collection system and method of using same" and filed Jun. 8, 2012, the disclosure of which is hereby incorporated by reference.

At block 310, the process 300A can access model parameters for true sizes. For example, for a user i, a true size can be $s_i \sim \mathcal{N}(\mu_i, \tau_s^2)$, and for an item j the true size can be $t_j \sim \mathcal{N}(C_j, \sigma_t^2)$ At block 315, the process 300A can access model parameters for fit thresholds. In some embodiments these can be predefined parameters for determining customized fit thresholds per user, or per user-item pair. In some embodiments a user can specify their preferred fit thresholds, for example through a user interface (e.g., customer can adjust a "slider" to set this threshold). As described above, while the various dimensions of a user have discreet measurements, items having corresponding dimensions falling within a range of measurements above and below the user's measurements can fit the user comfortably. As noted above, b1 can represent a small size boundary around a calculated true size of a user and b2 can represent a large size boundary around the calculated true size of the user. In some examples $|b1| <= |b2|$, because customers are expected to buy larger sizes over smaller sizes when the difference has the same magnitude due to comfort of fit. In one example of model parameters, $b1 \sim \mathcal{N}(\mu_{b1}, \sigma_{b1}^2)$, and $b2 \sim \mathcal{N}(\mu_{b2}, \sigma_{b2}^2)$.

At block 320, the process 300A can access purchase transaction data, for example from the transaction data repository 115. As described above, this data can include purchases and, in some situations, subsequent returns of items. Transaction data can also include any feedback provided from the user in the return process relating to the fit of the returned item. In some implementations, three years of transaction data, item data, and user data can be used for the calculations. The transaction data can represent purchases from a number of different users of a number of different items of the catalog.

At block 325, the process 300A can set a fit parameter for at least some of the transactions. The value of a fit parameter can represent knowledge (or an estimation) of how a purchased item fit the purchasing user. For example, the fit parameter can be set to "fit" if a user buys and does not return an item. If the user returns the item, the fit parameter can be set to one of "small" or "large," and such fit information can be determined in some embodiments by information provided by the user when making the return. In such embodiments, the return user interface of the electronic catalog can be formatted to require a user to input fit information in order for a user to complete a return transaction. In some situations, a user may specify during a return transaction that the item fit but is being returned for another reason, and in such situations the fit parameter can be set to "fit." In another situation, a user may keep (purchase and not return) an item that does not fit precisely, and the fit parameter can be set to "small" or "large." The determination of how to set the fit parameter in this situation can be based, for example, on information entered by the user in response to a prompt asking whether the item fits true to size. Such a prompt can be part of the item detail page, part of a feedback request sent to the user by the electronic catalog to solicit fit information, or can be a question presented by another user. Fit information can additionally or alternatively be mined from user reviews in some embodiments. In some embodiments, item fit can be determined in other ways, for example mined from social networking data (with customer consent), for example by identifying the item in an image and automatically determining the fit based on image analysis, or by identifying comments or text provided by the user regarding the item and determining the fit based on the comments or text.

For example, as described above, if an item does not fit a user can return it as "Small" or "Large" based on the side of boundary the item size lies in. Let $s_i$ be the hidden latent size of a customer i and $t_j$ be the hidden latent size of an ASIN j. If (i, j, Fit)∈D, then $s_i$ should be as close to $t_j$ as possible or $|s_i - t_j| \in 0$. Additionally, if (i, j, Small)∈D, then $(s_i - t_j)$ should be greater than a threshold $b1>0$. Further, if (i, j, Large)∈D, then $(s_i-t_j)$ is less than a threshold $b2<0$.

This ordinal relationship can be modeled by defining a parametric function $\alpha \cdot (s_i-t_j)$ representing a function on the difference in true sizes between user $s_i$ and item $t_j$ with a scale parameter $\alpha$. The following fit suitability definition captures the relationship between the fit suitability code and the parametric function:

$$fitCode(s_i, t_j) = \begin{cases} \text{Small,} & \text{if } \alpha \cdot (s_i - t_j) \geq b1 \\ \text{Large,} & \text{if } \alpha \cdot (s_i - t_j) \leq b1 \\ \text{Fit,} & \text{otherwise} \end{cases}$$

Probability distributions of "small," "fit," and "large can be defined using the following random variables:

$P(\text{Small}|s_i,t_j,\alpha,b1)=P(y_{ijs}=1|\beta^T x_{ijs})$ $P(\text{Fit}|s_i,t_j,\alpha,b1,b2)=P(y_{ijs}=0|\beta^T x_{ijs})P(y_{ijf}=1|\beta^T x_{ijf})$ $P(\text{Large}|s_i,t_j,\alpha,b1,b2)=P(y_{ijs}=0|\beta^T x_{ijs})P(y_{ijf}=0|\beta^T x_{ijf})$ As such, for each transaction $D_{ij} \in D$:

Select $y_{ij}$=Small with probability $P(\text{Small}|s_i,t_j,\alpha,b1)$

Select $y_{ij}$=Fit with probability $P(\text{Fit}|s_i,t_j,\alpha,b1,b2)$

Select $y_{ij}$=Large with probability $P(\text{Large}|s_i,t_j,\alpha,b1, b2)$

It will be appreciated that "fit," "small," and "large" represent one example of possible values for the fit parameter. Other examples can include a greater range of specific fits (very small, small, fit, large, and very large), numerical scales (−10 to 10 where negative numbers represent varying degrees of small fits and positive numbers represent varying degrees of large fits), and the like. During computation, a textual fit parameter value may be converted to a number, for example a binary number, an integer, or a decimal, depending upon the requirements of the computation system.

At block 330, using the measurements, model parameters, and fit parameters defined above, the process 300A can train a generative machine learning model to calculate latent user and item sizes and provide fit recommendations with probabilities. One example training process is described in more detail below with respect to FIG. 4. The training process can include accessing training data from data storage structures to train the model. In some embodiments, the machine learning model comprises a generative model that uses probability distributions specified by features, where the features are conditionally independent probability distributions. The probability distributions may comprise nodes that include discrete features (Dirichlet conditionally independent probability distribution) or continuous features (Gaussian conditionally independent probability distribution). In other embodiments, the machine learning model comprises a discriminative model, where input layer nodes including memory for storing input values, hidden layer nodes connected to the input layer nodes that include computer executable instructions/data for computing output layer nodes, and output layer nodes connected to the hidden layer nodes that include memory for storing output values indicative of fit probabilities.

Turning to FIG. 3B, at block 335 the process 300B can identify a target item and a target user. For example, when a user visits an item detail page of a parent item in the electronic catalog having multiple size variations, the process 300B can identify that item as the target item and the visiting user as the target user. In other examples, lists of parent items recommended for the user or lists of parent items responsive to queries by the user can be identified as target items and each can be analyzed for fit suitability of child items with the user. As described above, this can provide the benefit of removing items that will not fit the user from the queries or recommendations, or surfacing items that will fit above items that will not.

At block 340, the process 300B can apply the generated machine learning model to generate values and associated confidences for a fit between the target user and the target item. This can involve calculating the values latent sizes of the target user and target items as a probability distribution, and then using the calculated latent sizes to determine which child item would best fit the user and with what confidence.

At block 345, the process 300B can use the output to generate a fit recommendation as described herein and as illustrated in example user interfaces 200A, 200B.

One example of a context in which the disclosed recommendations can be presented relates to a system that allows a customer to perform a shape-based search of a product catalog using refinement shapes. For example, if a customer sees a shoe they like, they can take a picture of the shoe and send the image to a search engine. The search engine returns refinement shapes (e.g., shoe styles and shapes that match the picture) and the customer selects the refinement shape they are interested in (e.g., sneakers). After selecting the refinement shape, product details of various shoes that are associated with the refinement shape are returned to the customer. The disclosed recommendations can be provided with the product details. Such a system is disclosed in U.S. Pat. No. 9,514,487 titled "Shape-based search of a collection of content" and filed Sep. 30, 2010, the disclosure of which is hereby incorporated by reference.

Figure 4:
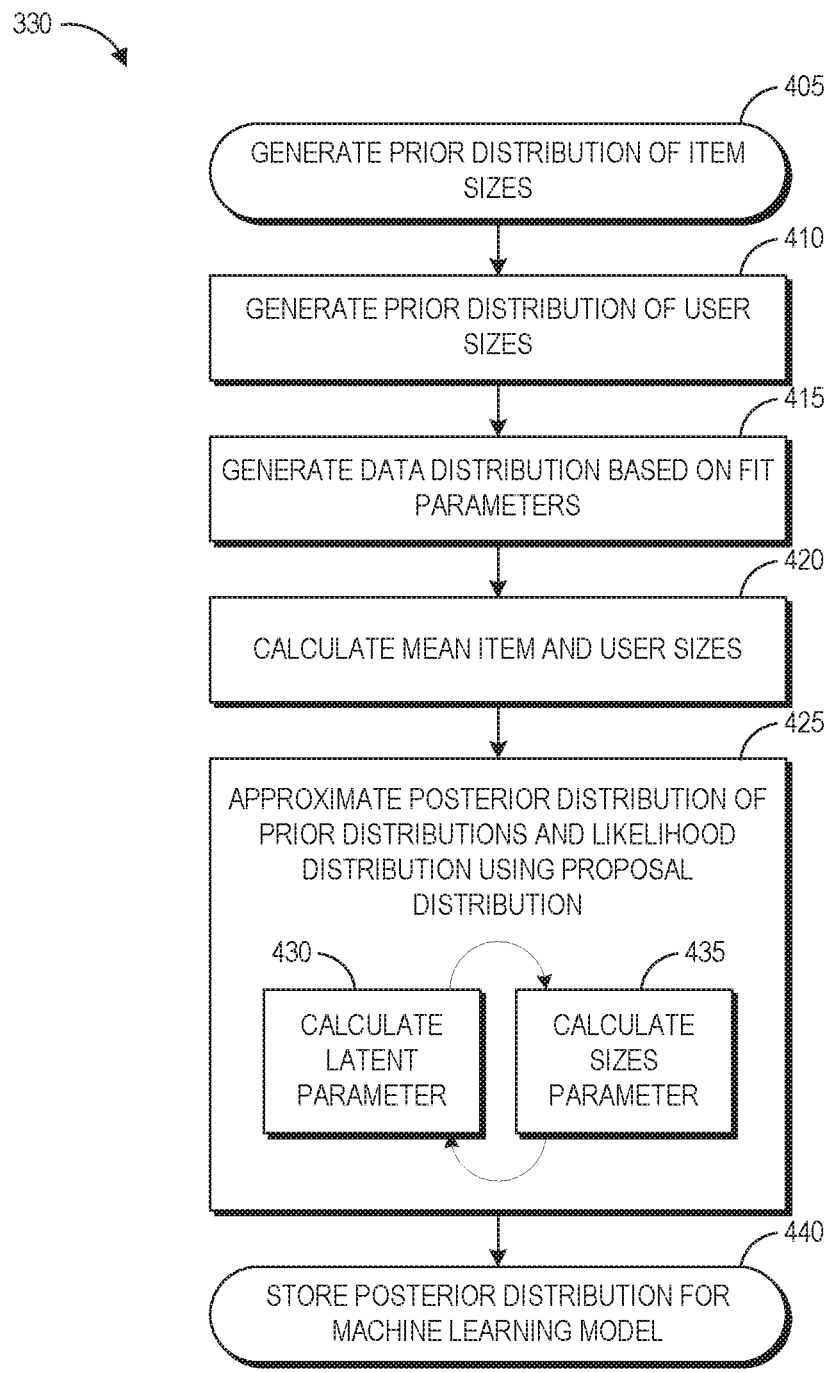
FIG. 4 depicts a flow diagram of further details of an illustrative process for training a machine learning model, for example as discussed with respect to FIG. 3A.

FIG. 4 depicts a flow diagram of further details of an illustrative process 330 for training a machine learning model, for example as discussed with respect to FIG. 3A.

At block 405, the process 330 can generate a prior distribution of item sizes, and at block 410 the process 330 can generate a prior distribution of user sizes. In the disclosed techniques, the prior distribution can be generated using measurement data obtained via a measurement project that measures items and/or users, measurements input by users for items and/or themselves, item measurements provided by the seller and/or manufacturer of an item, or measurements obtained from a database generally estimating measurements for various sizes. As described above, in some implementations, for certain users, measurement data can be extrapolated from a previous known or estimated true measurement using a growth function. In some embodiments, the prior distribution can be based at least partly on the posterior distribution of a previous iteration of training the model. In some embodiments, the prior distribution of item sizes calculated at block 405 can include item-level information, for example item brand or other item attributes that may relate to how an item will fit (e.g., category, materials, region of origin, etc.). Inclusion of such information can allow the model to extrapolate true item sizes for items with sparse data, for example items recently added to the catalog or other items having little or no associated purchase history information. Similarly, in some embodiments the prior distribution of user sizes calculated at block 410 can include user-level information, for example age and other demographic information. Inclusion of such information can allow the model to extrapolate true user sizes for users with sparse data, for example new users or users with little or no associated purchase history information. Thus, the priors can include item and user information in addition to physical measurements in some embodiments.

For example, catalog size can be a size provided by the manufacturer. When a manufacturer provides measurements corresponding to a catalog size for an item, the prior variance of item sizes for that item in that catalog size can be set according these measurements. When a manufacturer does not specify measurements corresponding to a catalog size, the prior variance can use a default measurement corresponding to the particular size indicator. In some embodiments the prior variance for item size can be determined by a measurement project in which the physical measurements of various dimensions of a sampling of items are determined. In this embodiment, the user prior variance can be measured in the project from the physical measurements of items that fit that user. In some embodiments, users may be able to input their measurements that are used for the prior variance. This can be accomplished, for example, through a numeric input user interface that allows the user to input measurements that they take of themselves. As another example, a user may be able to input two or three dimensional scans of the user from suitable imaging devices and the system can analyze the scans to approximate measurements of the user.

At block 415, the process 330 can generate a data distribution based on evidence of actual fits between users and items. The evidence-based distribution used for the disclosed generative model can be based, for example, on the fit parameters set at block 325 of process 300A using transaction data and/or data mined from user feedback.

At block 420, the process 330 can calculate initial mean item and user sizes. A mean size for a particular user can be initialized with the mean measurement of sizes of purchased items determined to fit the user. In other embodiments the mean size for a user can be based at least partly on measurements provided by the user. Item mean size can be initialized with catalog size $c_j$.

At block 425, the process 330 can implement Bayesian statistical inference to calculate a posterior distribution of estimated true sizes of both items and users of an electronic catalog based on the prior distribution of sizes for items and users, the data distribution, and the mean sizes. In one example, the joint data distribution is given by:

$$P(\beta, D | \Sigma) = \prod_{(y,x) \in D} \sigma(y, \beta^T, x) \cdot$$

$$\prod_i \mathcal{N}(s_i | \mu_i, \sigma_s) \cdot \prod_j \mathcal{N}(t_j | C_j, \sigma_t) \cdot \prod_{b \in \{b1, b2\}} \mathcal{N}(b | \mu_b, \sigma_b)$$

where $\Sigma = \{\{\mu_i\}, \{C_j\}, \sigma_s, \sigma_t, \mu_{b1}, \mu_{b2}, \sigma_{b1}, \sigma_{b2}\}$ and $\sigma(y, \theta)$ is the sigmoid function defined above.

The posterior distribution of β is given by $$P(\beta | D, \Sigma) = \frac{P(\beta, D | \Sigma)}{\int_\beta P(\beta, D | \Sigma) d\beta} \propto P(\beta, D | \Sigma)$$

However, computing the denominator in the above posterior distribution is very computationally expensive. For example, using current state of the art graphics processing units, the estimated run time for calculating this posterior distribution is approximately two years. As will be appreciated, that timeframe is unacceptable in the context of an electronic marketplace in which users will not wait for years to be provided with a size recommendation to aid in their purchase decision.

One approach to resolve this issue is to use Gibbs sampling. However, while reducing computation relative to that required for the posterior distribution, this approach is still computationally expensive. To simplify, the present technique introduces a poly-gamma latent variable to every logisitic term, defined as X~PG(b,c) with b>0 and c∈R, if $$X \stackrel{D}{=} \frac{1}{2\pi^2} \sum_{k=1}^{\infty} \frac{g_k}{(k - 1/2)^2 + c^2/(4\pi^2)}$$

where $\stackrel{D}{=}$ indicates equality in distribution and gk~Ga(b, 1) are independent gamma random variables.

However, even using the poly-gamma latent variable β cannot be sampled efficiently because the covariance matrix is not diagonal, and as the model involves millions of parameters even storing the covariance matrix is not feasible. Accordingly, the present technique applies mean field variational inference to make the training process efficient. The posterior distribution can be approximated using a proposal distribution (q(Q, β) that simplifies to the following:

$$q^*(\beta_i) = \mathcal{N}(\hat{m}_{\beta_i}, \hat{v}_{\beta_i}) \text{ where}$$

$$\frac{1}{\hat{v}_{\beta_i}} = \left( \frac{1}{\sigma_{\beta_i}^2} + \sum_{j \in D \& x_{ji} \neq 0} E[w_j] x_{ji}^2 \right)$$

$$\frac{\hat{m}_{\beta_i}}{\hat{v}_{\beta_i}} = \left( \frac{\mu_{\beta_i}}{\sigma_{\beta_i}^2} \sum_{j \in D \& x_{ij} \neq 0} \left( (y_j - 1/2)(x_{ji}) - E[w_j] x_{ji} \left( \sum_{l \neq i} x_{jl} E[\beta_l] \right) \right) \right)$$

Thus, as shown by blocks 430 and 435, the proposal distribution can be calculated by iteratively solving for (430) the latent parameter q(wi) using fixed user and item sizes (for example, the initialized mean values for a first iteration) and (435) the user and item sizes using a fixed latent parameter value. This can be done until convergence, for a predetermined number of iterations, or for a predetermined length of time. Convergence may occur within ten iterations in some examples. In one example of an electronic catalog having millions of users and millions of items, the above-described training process can take approximately fifteen to thirty minutes, making the machine learning model a feasible solution for provision of fit recommendations.

At block 440 the process 300B can store the posterior distribution (or its approximation via the proposal distribution) as the machine learning model. The stored model can be used to generate the fit recommendations and associated confidence values as described herein, even in cold start or sparse data scenarios.

Some or all of the processes 300A, 300B, 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations of hardware and software. For example, the processes 300A, 300B, 400 may be performed by the interactive computing system 500 of FIG. 5. The code may be stored on a computer-readable storage medium, for example, in the form of a computer program comprising a plurality of instructions executable by one or more processors. The computer-readable storage medium may be non-transitory.

Consider the following illustrative example. A user may purchase a set of ten child items over a period of time, and transaction data representing these purchases can indicate that the user kept five and returned five. Of the five returned, the return codes selected by the user indicate that two were too small and three were too big. The disclosed machine learning techniques can be used to identify an initial estimate of item size for each of the ten items based on measurement data, for example measurements provided by the manufacturer. Using an average of the measurements of the five kept items, the disclosed techniques can determine an initial estimate of the size of the user. For the five return purchases, three can have fit parameters assigned the value of "large" and two can have fit parameters assigned the value of "small." The disclosed generative model can be applied to the initial estimated measurements to refine them using the transaction data in order to identify a true size of the user and each item expressed as a probability distribution. As described above, the trained generative model can be used to generate a "true size" value for other items in the catalog. Thus, when the user views the detail page of another item, the disclosed techniques can determine a true size of the user and a true size of the item using the generative model, generate a fit estimation based on the true sizes, the fit estimation representing both a fit between the user and the item and probability of the accuracy of the fit, and output a fit recommendation in accordance with the fit estimation and corresponding probability.

Execution Environment

Figure 5:
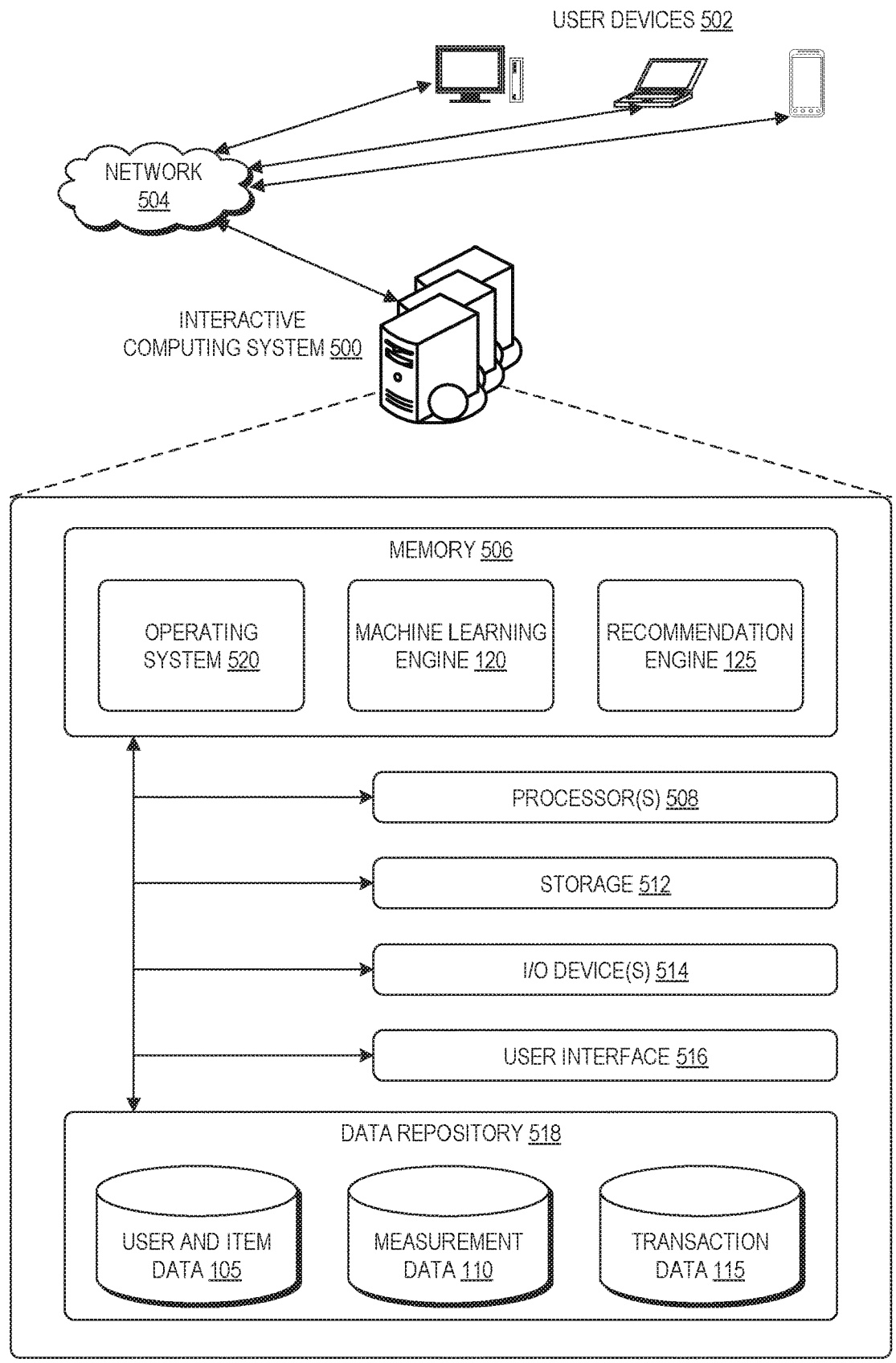
FIG. 5 is a block diagram of an illustrative computing system configured to implement training and processing of generative models, for example in the recommendation engine of FIG. 1.

FIG. 5 is a block diagram of an illustrative computing system configured to implement training and processing of generative models as described above. The architecture of the interactive computing system 500 may include a memory 506 storing an operating system 520, machine learning engine 120, and recommendation engine 125, which can be in direct communication with one another or distributed among computing devices within a networked computing system and in communication with each other. Components used for the architecture may depend at least in part upon the type of network and/or environment selected.

The interactive computing system 500 may include one or more computers, perhaps arranged in a cluster of servers or as a server farm. The memory and processors that make up these computers may be located within one computer or distributed throughout many computers as detailed herein. These servers may be configured to train recommendations engines and manage recommendations. For example, the interactive computing system 500 may be configured to manage recommendations offered in connection with an electronic marketplace.

The interactive computing system 500 may include at least one memory 506 and one or more processing units (or processor(s)) 508. The memory 506 may include more than one memory and may be distributed throughout the interactive computing system 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, machine learning engine 120, and recommendation engine 125.

The memory 506 may include operating system 520 for interacting with the interactive computing system 500. Interactive computing system 500 can host an interactive electronic catalog through which users can view and purchase items.

As discussed above, the machine learning engine 120 may be configured to manage generation of prior distributions and data distributions, mean parameter calculations, introduce priors for fit thresholds, and train a generative model or other machine learning model as described above. The recommendation engine 125 can be configured to use machine learning models generated by the machine learning engine 120 to provide recommendations or predictions, for example to users of an electronic commerce system. Although shown as a component of the interactive computing system 500, some embodiments of the recommendation engine 125 can be implemented locally on a user device 502 or distributed between the computing system 500 and a user device 502. For example, measurement data determined using the disclosed model for a user account can be pushed to one or more devices of the user and then used locally by the user device to provide the disclosed fit suitability recommendations. The measurement data can include data for all personas associated with the user account. In such embodiments, distributions for true item sizes can be accessed by the user device as needed for generating recommendations, for example as a user visits the detail pages for particular items.

The processor 508 may include one or more general purpose computers, dedicated microprocessors, graphics processing units (GPUs), or other processing devices capable of communicating electronic information and/or training complex machine learning models. Examples of the processor 508 include one or more application-specific integrated circuits (ASICs), field programmable gate arrays (FPGAs), digital signal processors (DSPs) and any other suitable specific or general purpose processors. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be utilized by a user to access portions of the interactive computing system 500. In some examples, the user interface 516 may include a graphical user interface, web-based applications, programmatic interfaces such as application programming interfaces (APIs), or other user interface configurations. The user interface 516 can include displays of the recommendations described herein, for example the illustrative user interfaces 200A, 200B shown in FIGS. 2A and 2B.

The interactive computing system 500 may also include a data store 518. In some examples, the data store 518 may include one or more data stores, databases, data structures, or the like for storing and/or retaining information associated with the interactive computing system 500. Thus, the data store 518 may include data structures, such as user and item data repository 105, measurement data repository 110, and transaction data repository 115 described above.

The interactive computing system 500 can communicate over network 504 with user devices 502. The network 504 can include any appropriate network, including an intranet, the Internet, a cellular network, a local area network or any other such network or combination thereof. User devices 502 can include any network-equipped computing device, for example desktop computers, laptops, smartphones, tablets, e-readers, gaming consoles, and the like. Users can access the interactive computing system 500 and interact with items therein via the network 504 and can be provided with recommendations via the network 504.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   at least one electronic data repository storing data representing:
      a plurality of users of an electronic catalog and a plurality of items represented in the electronic catalog, wherein individual ones of the plurality of items are available in one or more size options; and
      a history of user interactions performed by the plurality of users with respect to the plurality of items, wherein the user interactions include a plurality of transactions for particular size options of the plurality of items;
   a computer-readable memory storing executable instructions; and
   one or more processors in communication with the computer-readable memory, wherein the one or more processors are programmed by the executable instructions to at least:
      identify training data including (i) an initial distribution of item sizes representing measurements of the one or more size options for the individual ones of the plurality of items, (ii) an initial distribution of user sizes representing measurements of the plurality of users, and (iii) a plurality of fit suitability indications based on corresponding transactions of the plurality of transactions;
      train a generative model for predicting size suitability at least partly on the initial distribution of item size, the initial distribution of user sizes, and the plurality of fit suitability indications;
      calculate, using the generative model, a true size for a target user of the plurality of users, said true size for the target user comprising one or more true physical measurements of a body portion of the target user;
      calculate, using the generative model, a true size for a target item of the plurality of items, said true size for the target item comprising one or more true physical measurements of the target item;
      calculate a posterior probability distribution of size suitability between the target user and the target item based, at least in part, on the true size of the target user and the true size of the target item, wherein the posterior probability distribution includes at least one fit estimation and a corresponding probability; and
      cause presentation to the target user of a fit recommendation for the target item in accordance with the fit estimation and corresponding probability.

2. The system of claim 1, wherein, to train the generative model, the one or more processors are programmed by the executable instructions to at least:
   estimate a latent parameter using fixed user sizes and fixed item sizes, and
   estimate actual user and item sizes using a fixed latent parameter.

3. The system of claim 2, wherein, to estimate the latent parameter, the one or more processors are programmed by the executable instructions to at least:
   generate the fixed item sizes by initializing, for the size options of the individual ones item of the plurality of items, a fixed item size value based on measurements corresponding to the size options; and
   generate the fixed user sizes by initializing, for individual users of the plurality of users, a fixed user size value based on a measurement corresponding to an average size of a subset of the plurality of items that, as indicated by the data representing the plurality of transactions, have been purchased and not returned by the user.

4. The system of claim 2, wherein, to train the generative model, the one or more processors are programmed by the executable instructions at least iterate, until convergence or for a predetermined number of iterations, estimating the latent parameter and estimating the actual user and item sizes.

5. The system of claim 2, wherein estimating the latent parameter and estimating the actual user and item sizes are based partly on the initial distribution of item sizes and the initial distribution of user sizes.

6. The system of claim 1, wherein the one or more processors are programmed by the executable instructions to:
   in an offline mode, identify the training data, train the generative model, and calculate the true sizes for the plurality of users and plurality of items; and
   in an online mode, identify the target item and the target user, calculate the posterior probability distribution of size suitability, and cause presentation of the fit recommendation.

7. The system of claim 1, wherein:
   a transaction of the plurality of transactions includes a purchase and subsequent return, by a user of the plurality of users, of an item of the plurality of items, and to determine a fit suitability indication corresponding to the transaction for the item, the one or more processors are programmed by the executable instructions to at least:
 access fit suitability feedback provided by the user for the return of the item, and
 based on the fit suitability feedback, determine the fit suitability indication.

8. The system of claim 1, wherein:
 a transaction of the plurality of transactions includes a purchase not subsequently returned, by a user of the plurality of users, of an item of the plurality of items, and
 to determine a fit suitability indication corresponding to the transaction for the item, the one or more processors are programmed by the executable instructions to at least, based on the user not returning the item, determine the fit suitability indication as fit.

9. The system of claim 1, wherein the posterior probability distribution includes a first fit estimation, a second fit estimation, and a true fit estimation having corresponding probabilities.

10. The system of claim 1, wherein the generative model is structured to approximate the posterior probability distribution using a proposal distribution.

11. The system of claim 1, wherein a transaction of the plurality of transactions is an item return transaction by a user with feedback indicating that a returned item is being returned for a reason other than fit, and wherein the one or more processors are programmed to record a positive fit suitability indication for the returned item and user in response to said feedback.

12. A non-transitory computer readable medium storing a computer-executable module that, when executed by a computing system comprising one or more computing devices, causes the computing system to perform operations comprising:
 accessing first data representing a plurality of users of an electronic catalog and a plurality of items represented in the electronic catalog, wherein individual items of the plurality of items are available in one or more size options;
 accessing second data representing a plurality of transactions by the plurality of users for particular size options of the plurality of items;
 generating an initial distribution of item sizes representing measurements of the one or more size options for at least some of the plurality of items;
 generating an initial distribution of user sizes representing measurements of at least some of the plurality of users;
 generating a plurality of fit suitability indications based on corresponding ones of the plurality of transactions;
 training a generative model for predicting size suitability at least partly on the initial distribution of item sizes, the initial distribution of user sizes, and the plurality of fit suitability indications; and
 using the generative model to generate a fit recommendation for a target user by a process that comprises:
  calculating a true size for the target user with the generative model, said true size comprising one or more true physical measurements of a body portion of the target user;
  calculating a true size for a target item, said true size for the target item comprising one or more true physical measurements of the target item;
 calculating a posterior probability distribution of size suitability between the target user and the target item based at least partly on the true size for the target user and the true size for the target item, wherein the posterior probability distribution includes at least one fit estimation and corresponding probability; and
 causing presentation to the target user of a fit recommendation for the target item in accordance with the fit estimation and corresponding probability.

13. The non-transitory computer readable medium of claim 12, wherein a transaction of the plurality of transactions includes a purchase and subsequent return, by a user of the plurality of users, of an item of the plurality of items, the operations further comprising:
 accessing fit suitability feedback provided by the user for the return of the item, and
 determining, based on the fit suitability feedback, a fit suitability indication corresponding to the transaction.

14. The non-transitory computer readable medium of claim 12, wherein a transaction of the plurality of transactions includes a purchase not subsequently returned, by a user of the plurality of users, of an item of the plurality of items, the operations further comprising:
 determining, based on the user not returning the item, a fit suitability indication corresponding to the transaction as fit.

15. The non-transitory computer readable medium of claim 12, further comprising accessing the generative model to calculate the posterior probability distribution, wherein the posterior probability distribution includes a first fit estimation, a second fit estimation, and a true fit estimation having corresponding probabilities.

16. The non-transitory computer readable medium of claim 12, the operations further comprising:
 accessing the generative model; and
 calculating the posterior probability distribution at least partly by approximating the posterior probability distribution using a proposal distribution.

17. A computer-implemented method comprising:
 by a computing system comprising one or more computing devices configured with specific computer-executable instructions,
 accessing a model for predicting size suitability trained at least partly by:
  obtaining training data comprising:
   measurement data representing measurements of a plurality of users of an electronic catalog and a plurality of items represented in the electronic catalog; and
   transaction data representing plurality of transactions by the plurality of users for particular size options of the plurality of items;
  generating, based on the measurement data, an initial distribution of item sizes and an initial distribution of user sizes;
  generating a plurality of fit suitability indications based on corresponding ones of the plurality of transactions; and
  training the model for predicting size suitability at least partly on the initial distribution of item sizes, the initial distribution of user sizes, and the plurality of fit suitability indications;
 generating a probability distribution of size suitability between a target user and a target item based on the model, wherein the probability distribution includes fit estimation and corresponding probability between the target user and the target item, wherein generating the probability distribution comprises using the trained model to estimate a true size for the target user and a true size for the target item, said true size for the target user comprising one or more true physical measurements of a body portion of the target user, said true size for the target item comprising a true physical measurement of the target item; and causing presentation to the target user of a fit recommendation for the target item in accordance with the fit estimation and corresponding probability.

18. The method of claim 17, wherein the posterior probability distribution includes a first fit estimation, a second fit estimation, and a true fit estimation having corresponding probabilities.

19. The method of claim 17, further comprising approximating the posterior probability distribution using a proposal distribution.

* * * * *